(12) United States Patent
Chang et al.

(10) Patent No.: US 8,046,111 B2
(45) Date of Patent: Oct. 25, 2011

(54) SYSTEM AND METHOD FOR CONTROLLING MULTIPLE FACTS

(75) Inventors: Byung Hoon Chang, Daejeon (KR); Yong Hak Kim, Daejeon (KR); Soo Yeol Kim, Daejeon (KR); Jong Su Yoon, Daejeon (KR); No Hong Kwak, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 279 days.

(21) Appl. No.: 12/324,763

(22) Filed: Nov. 26, 2008

(65) Prior Publication Data
US 2010/0082177 A1   Apr. 1, 2010

(30) Foreign Application Priority Data
Oct. 1, 2008   (KR) .............................. 2008-0096579

(51) Int. Cl.
*G06F 1/28* (2006.01)
(52) U.S. Cl. .................. 700/298; 700/286; 700/297
(58) Field of Classification Search .................. 700/20, 700/22, 286, 295, 297, 298
See application file for complete search history.

(56) References Cited

U.S. PATENT DOCUMENTS

| | | | |
|---|---|---|---|
| 5,541,498 A * | 7/1996 | Beckwith ...................... 323/211 |
| 6,690,175 B2 * | 2/2004 | Pinzon et al. ................. 324/525 |
| 6,754,597 B2 * | 6/2004 | Bertsch et al. ............... 700/292 |
| 7,069,117 B2 * | 6/2006 | Wilson et al. ................. 700/295 |
| 7,091,703 B2 * | 8/2006 | Folts et al. .................... 323/207 |
| 7,729,810 B2 * | 6/2010 | Bell et al. ...................... 700/295 |
| 2008/0103737 A1 | 5/2008 | Yoon et al. ........................ 703/4 |
| 2009/0085407 A1 * | 4/2009 | Venkatasubramanian ...... 307/98 |

FOREIGN PATENT DOCUMENTS

| | | |
|---|---|---|
| EP | 1 737 098 A1 | 12/2006 |
| EP | 1 198 069 A1 | 6/2008 |
| JP | 10-285804 | 10/1998 |
| JP | 2001-352678 | 12/2001 |
| KR | 10-2006-0038284 | 3/2006 |
| KR | 10-2007-0037210 | 4/2007 |
| KR | 10-2007-0105163 | 10/2007 |

* cited by examiner

*Primary Examiner* — Charles Kasenge
(74) *Attorney, Agent, or Firm* — Martine Penilla & Gencarella, LLP

(57) ABSTRACT

Disclosed are a system and method with a cooperative control algorithm that can appraise voltage stability of a power system in cooperation with a supervisory control and data acquisition (SCADA)/emergency management system (EMS) for cooperative control on multiple parallel flexible alternating current transmission systems (FACTS) to enhance voltage stability, and that can calculate individual operation points of the FACTS.

7 Claims, 4 Drawing Sheets

SYSTEM AND METHOD FOR CONTROLLING MULTIPLE FACTS

BACKGROUND OF THE INVENTION

1. Field of the Invention

The present invention relates to a system and method with a cooperative control algorithm that can appraise voltage stability of a power system in cooperation with a supervisory control and data acquisition (SCADA)/emergency management system (EMS) for cooperative control on multiple parallel flexible alternating current transmission systems (FACTS) to enhance voltage stability, and that can calculate individual operation points of the FACTS.

2. Description of the Related Art

In the case where a spinning reactive power source such as a parallel flexible alternating current transmission system (FACTS) is installed in a power system, it inevitably exhibits different features from the existing system. Therefore, there is a need for employing and controlling the FACTS based on an accurate analyzing technology of the power system to extend and operate a large-scaled power system.

In other words, the technology of modeling and analyzing the FACTS has hitherto been developed, but, in order to apply the FACTS to a wide-area power system, there is a need for a comprehensive control system capable of accurately appraising and analyzing an influence of multiple FACTS on the power system to properly control the FACTS according to situations of neighboring power systems.

Also, in terms of utilizing a relatively inexpensive power generation of a non-metropolitan area in a domestic power system, a problem with voltage stability restricts power flexibility of a metropolitan area. Further, such power flexibility of the metropolitan area has been used as a yardstick of economical administration of the power system. In terms of planning and administering the power system, the most effective proposal for enhancement of the voltage stability is to introduce proper reactive power or to break a load. Here, a substantial proposal for maintaining the voltage stability is to introduce a reactive power source.

Accordingly, it may be advantageous to provide a control system with a cooperative control algorithm that can appraise voltage stability of a power system in cooperation with a supervisory control and data acquisition (SCADA)/emergency management system (EMS) for cooperative control on multiple parallel flexible alternating current transmission systems (FACTS) to enhance the voltage stability, and that can calculate individual operation points of the FACTS.

For example, it may be advantageous to provide a cooperative control system of the multiple FACTS and a method of implementing the same, which can determine, for example, situations of a domestic metropolitan power system according to conditions or voltage stability through simulation based on data from the SCADA/EMS, and can automatically generate a corresponding command so as to secure the voltage stability according to the power systems or local regions at a normal operation or a trouble with the system.

SUMMARY OF THE INVENTION

The present invention is conceived to solve the problems of the conventional techniques as described above, and an aspect of the present invention is to provide a control system with a cooperative control algorithm that can appraise voltage stability of a power system in cooperation with a supervisory control and data acquisition (SCADA)/emergency management system (EMS) for cooperative control on multiple parallel flexible alternating current transmission systems (FACTS) to enhance voltage stability, and that can calculate individual operation points of the FACTS.

That is, an aspect of the present invention is to provide the cooperative control system of the multiple FACTS and the method of implementing the same, which can determine, for example, situations of a domestic metropolitan power system according to conditions or voltage stability through simulation based on data from the SCADA/EMS, and can automatically generate a corresponding command so as to secure the voltage stability according to the power systems or local regions during normal operation or during system malfunction.

In accordance with an aspect of the present invention, a method of controlling multiple flexible alternating current transmission systems (FACTS) includes: monitoring voltage stability based on data from a supervisory control and data acquisition (SCADA)/emergency management system (EMS) that receives data from a power system and FACTS data from local FACTS controllers; determining whether a margin of the voltage stability is within a reference stability and generating a reference voltage Vref and a reactive power output Qout as a control command for changing an operation point of the FACTS each being installed in a substation if the margin of the voltage stability is within the reference stability; and supplying the reference voltage and the reactive power output to the FACTS controller of each local substation, the FACTS controller of each local substation being operated with the operation point changed depending on the control command and providing the FACTS data to the SCADA/EMS.

Monitoring voltage stability may be performed through a flow voltage (FV) module, a reactive power & voltage current (VQVI) module, a power-voltage (PV) module, and a voltage variation ($\Delta V$) module. Further, each local substation may use communication-based information technology (IT) to communicate data.

In accordance with another aspect of the present invention, a system of controlling multiple flexible alternating current transmission systems (FACTS) includes: a supervisory control and data acquisition (SCADA)/emergency management system (EMS) configured to receive data from a power system and FACTS data from local FACTS controllers; and a multiple-FACTS controller configured to monitor voltage stability based on data from the SCADA/EMS, to generate a reference voltage Vref and a reactive power output Qout as a control command for changing an operation point of the FACTS each installed in a substation, and to supply the reference voltage and the reactive power output to the FACTS controller of each local substation, the FACTS controller of each local substation being operated with the operation point changed depending on the control command, and providing the FACTS data to the SCADA/EMS.

The multiple-FACTS controller may include a flow voltage (FV) module, a reactive power & voltage current (VQVI) module, a power-voltage (PV) module, and a voltage variation ($\Delta V$) module to monitor the voltage stability. Further, each local substation may use communication-based information technology (IT) to communicate data. Also, this system may further include a terminal configured to receive an output from the multiple-FACTS controller and to display the output to a supervisor.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE INVENTION

In general, a parallel flexible alternating current transmission system (FACTS) is equipment for rapidly supplying reactive power to a power system, and is used to enhance bus voltage and stability of the power system. As the equipment for enhancing the bus voltage, there are transformer taps, serial/parallel capacitors, reactors, etc., as well as the FACTS. However, such equipment may cause various problems when being individually operated. For example, in the case where the bus voltage is lowered to a reference level or less due to power system malfunction, if reactive power sources are concurrently operated without cooperative control, the reactive power may be instantly over-compensated so that the bus voltage can become higher, thereby increasing a load of the power system and increasing demand of the reactive power in the power system. Generally, a margin of active power, a margin of the reactive power, a reserve of the reactive power, the bus voltage, etc. are used as an index for appraising the voltage stability.

In the present invention, a cooperative control system of the multiple FACTS maintains a voltage profile within an operation range, secures the margin of the reactive power, and calculates an operation point of an individual FACTS to maintain the voltage stability.

For example, since the stability of a domestic power system is restricted by the amount of power inter-supplied to a metropolitan area via a northward line, it is necessary to monitor the voltage stability in real-time and analyze the margin of power interchange (f-V) for the cooperative control of the multiple FACTS.

Figure 1A:
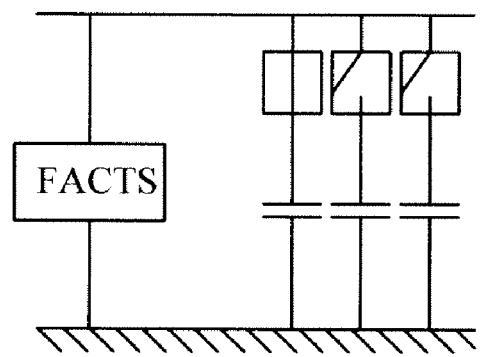
FIGS. 1a and 1b are schematic diagrams showing a cooperative operation in a flexible alternating current transmission system (FACTS) according to an embodiment of the present invention.
Figure 1B:
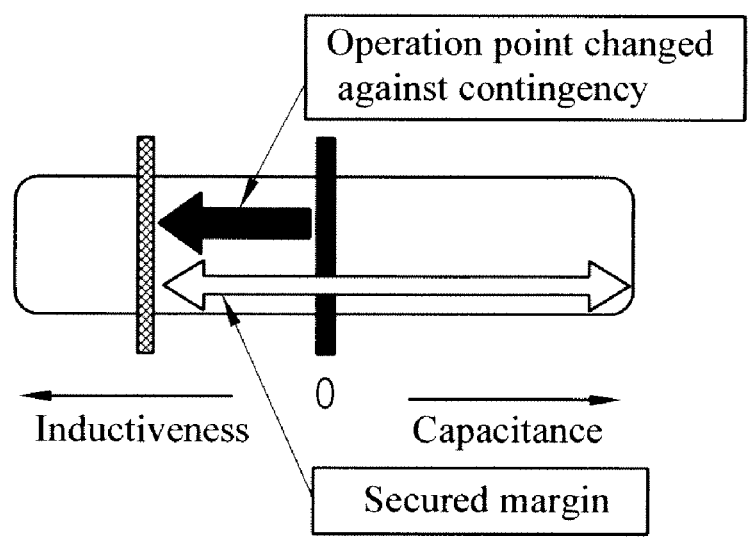

A fundamental concept of the present invention is shown in FIGS. 1a and 1b.

FIG. 1a shows a concept that a high-accuracy and expensive FACTS is combined with a relatively-inexpensive shunt capacitor or the like and is operated in cooperation with the shunt capacitors, and FIG. 1b is a schematic diagram explaining an inventive concept that allows spinning reactive power to be reserved by previously changing an operation point of the FACTS in a direction of an upper arrow, i.e., toward an inductive region, in order to secure capacitance largely in the shunt capacitors against dangerous accidents like a lower arrow. This means that the voltage stability margin is enhanced.

However, for the margin analysis of the power interchange, it is possible to determine the general stability of the power system, but difficult to determine local features thereof. For example, the margin analysis is inadequate to the index for the cooperative control of the FACTS installed in a Yang-ju substation, a Mi-gum substation and an Fast-Seoul substation in Korea.

Accordingly, to examine a domestic power system where the multiple FACTS is operated, the margin analysis of the reactive power VQ and examination of another index for determining the local features of the system are performed at the same time.

Figure 2:
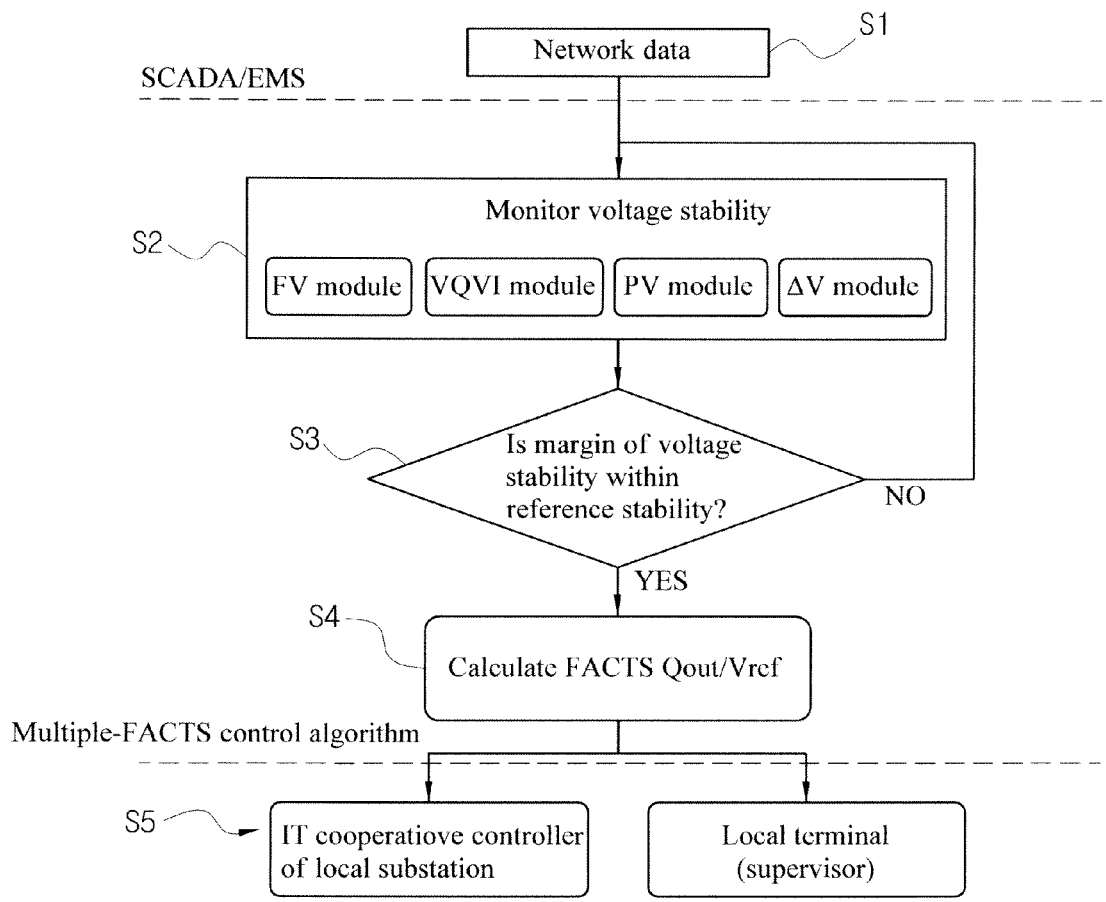
FIG. 2 is a schematic flowchart of a cooperative control algorithm of the FACTS according to the embodiment of the present invention.

FIG. 2 is a schematic flowchart of a cooperative control algorithm of the multiple FACTS to secure the stability in the margin analysis.

As shown in FIG. 2, the cooperative control algorithm of the multiple parallel FACTS receives data about a supervisory control and data acquisition (SCADA)/emergency management system (EMS), i.e., network data (S1); and monitors the voltage stability through a flow voltage (FV) module, a reactive power & voltage current (VQVI) module, a power-voltage (PV) module, and a voltage variation ($\Delta V$) module (S2). It should be noted that these modules are easily configured by those skilled in the art in order to monitor the voltage stability, and that additional modules may be used for determining other stability.

Then, it is determined whether the margin of the voltage stability is within a reference stability (S3). If the margin of the voltage stability is within the reference stability, the voltage stability of the power system is appraised to calculate a reference voltage Vref and a reactive power output Qout where each operation point of the FACTS is changed (S4), thereby providing calculation results to a cooperative controller of a local substation and a local/central terminal (supervisor) which use communication-based information technology (IT) (S5). Here, in operation S4 for the calculation, the PV module, the VQ module and the FV module, which employ a voltage stability analysis of applying a continuous flow-voltage calculating method to given contingency, are driven to determine the reference voltage Vref and the reactive power output Qout according to the state of the system through calculation of power and flow voltage.

Thus, the voltage stability is simulated in the multiple-FACTS control system, so that a bus voltage and stability can be maintained according to the power systems or locations. Particularly, the FACTS control system is realized by a separate controller that minimizes costs of the system at all times and generates a control command in consideration of the voltage and the stability at the contingency.

Figure 3:
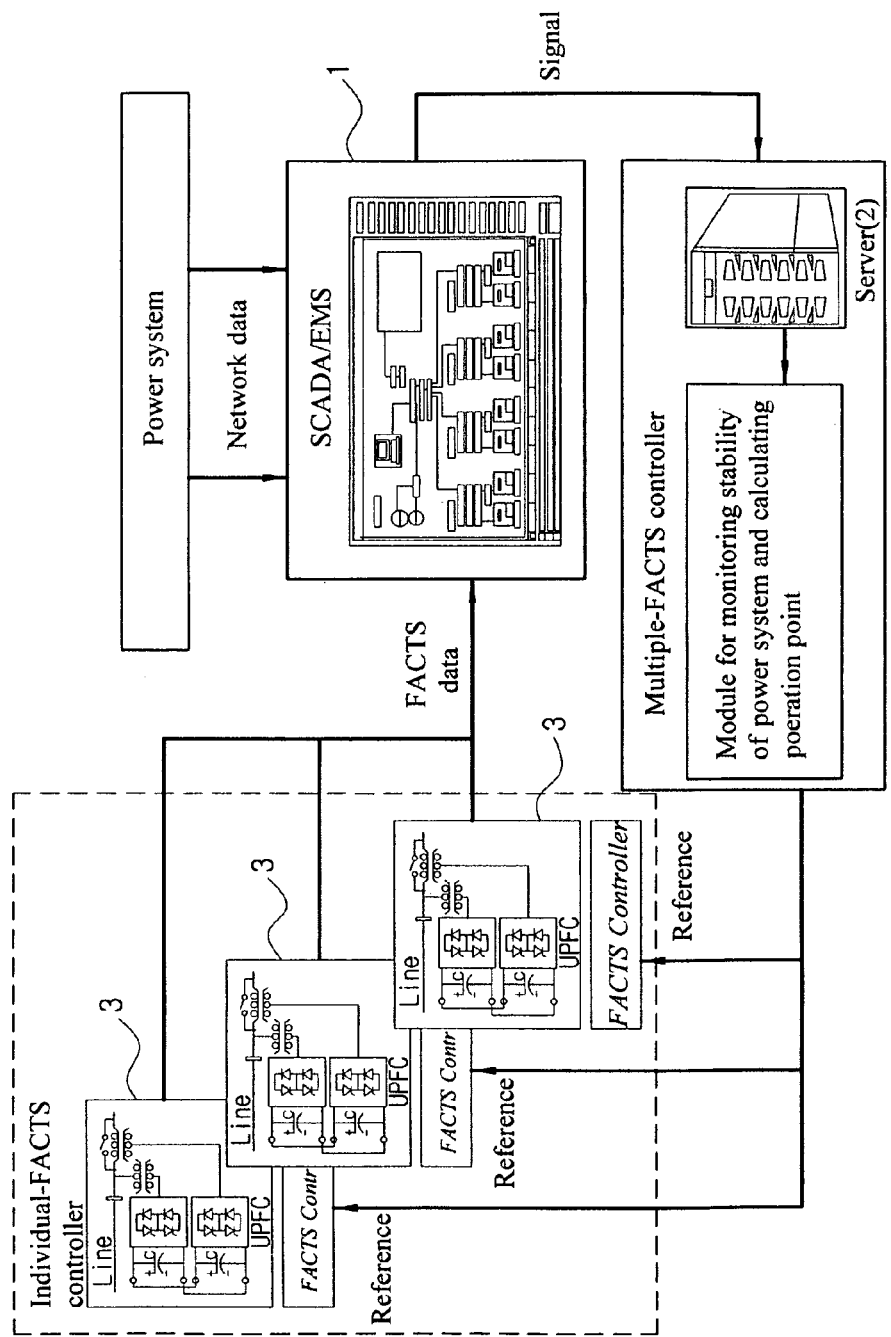
FIG. 3 shows a system configuration for controlling multiple FACTS according to an embodiment of the present invention.

FIG. 3 shows a system configuration for controlling multiple FACTS according to an embodiment of the present invention.

Input of the cooperative control algorithm of the FACTS in FIG. 2 is based on data about the SCADA/EMS as shown in FIG. 3 to correctly reflect the features of the power system (or the metropolitan area). After performing the margin analysis of the power interchange (f-V), if the stability margin is insufficient as compared with the standards defined by international standards organization (ISO), the cooperative control for securing the stability margin is performed. If the margin of the power interchange is sufficient, there is no need to operate the FACTS in the inductive region and thus the operation point of the FACTS is not changed. On the other hand, a VQ analysis is an index representing a relationship between the contingency and a corresponding bus. If an absolute margin of the reactive power on an "A" bus is smaller than that of a "B" bus after the contingency, it may be determined that the "A" bus is more vulnerable to this contingency than the "B" bus. If the local features of the reactive power are considered, it is further effective to introduce the reactive power to the "A" bus.

In this embodiment, a regularized margin of the reactive power is used as the index. That is, a VQVI (%) index is used for determining the operation point of the multiple FACTS so as to efficiently secure the margin of the power interchange (f-V). Here, a bus has a large VQVI index, this means that this bus is highly vulnerable to power system malfunction. Accordingly, to efficiently reduce the restriction due to the contingency, there is a need to supply more reactive power to the bus having the large VQVI index.

Referring to FIG. 3, network data from the power system and FACTS data from each local substation are given to the SCADA/EMS 1. The SCADA/EMS 1 allows a multiple-FACTS controller in its own data base (DB) server 2 to monitor the stability of the power system and drive a module for calculating the operation point (see FIG. 2), thereby generating the Qout and the Vref of the FACTS. Here, the multiple-FACTS controller may be realized as a calculator and provided with various modules therein. A signal output from the SCADA/EMS 1 to the DB server 2 means that flow-voltage calculation data for system analysis, which contains information about power generation, a load, network data, etc., is provided.

Then, the Qout and the Vref of the FACTS are sent to the FACTS controllers 3 of the local substations, respectively. In FIG. 3, three FACTS controllers 3 are shown for descriptive convenience, but more than three FACTS controllers 3 can be used in practice. Each of the FACTS controllers 3 is controlled under a control command of changing the operation point of the FACTS, and provides the SCADA/EMS 1 with data (a voltage, an output, and an operating state) about the FACTS.

Figure 4:
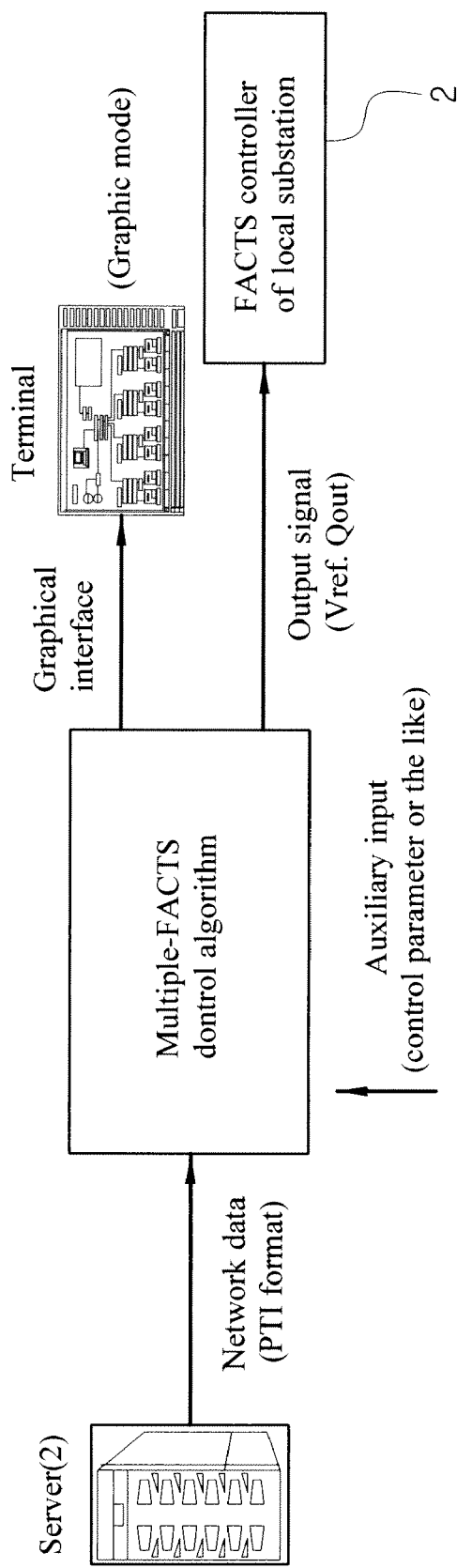
FIG. 4 shows details of a FACTS cooperative controller in FIG. 3.

As such, according to the control command of changing the operation point of the FACTS installed in each local substation, the Vref and the Qout are generated as shown in FIG. 4 and output to the FACTS controller 3 of each substation, and the changed operation-point is sent to the EMS/SCADA 1.

FIG. 4 shows a relationship between the multiple-FACTS control algorithm of the DB server 2 and the terminal in FIG. 3. In the DB server 2, the network data having a format based on power system simulator for engineering (PSS/E) of power technologies international (PTI) is input to the multiple-FACTS control algorithm as shown in FIG. 2. Additionally, a control parameter or the like may be input. The multiple-FACTS control algorithm generates the Vref and the Qout as signals output through the operations of FIG. 2, and provides them to the FACTS controllers 3 of each local substation. Further, the Vref and the Qout may be shown to the supervisor through a graphical interface of the terminal.

With these processes, the bus voltage and the stability are maintained according to the power system or the locations through the simulation in the multiple-FACTS control system.

The cooperative control system of the multiple FACTS drives the FACTS to minimize loss at all times and to maintain the voltage stability of the power system at the contingency.

According to an embodiment of the present invention, the f-V margin analysis to the N-1 contingency on a main power supply line of the Korean power system could be presented, and the Yang-ju, Mi-gum and East-Seoul substations were appraised with respect to "VQVI" at the contingency in order to increase the margin based on the result from the f-V margin analysis. As a result, it was found that the Mi-gum substation and the East-Seoul substation were more vulnerable to the contingency in the east of the metropolitan area than the Yang-ju substation, while the Yang-ju substation was further susceptible to the contingency in the west of the metropolitan area. In particular, to increase the margin based on the result from the f-V margin analysis, a case that each FACTS reserves a predetermined spinning reactive power was compared with a case that a relatively large spinning reactive power is reserved for the bus vulnerable to the trouble with the system. That is, according to the present invention, the state of the power system is monitored through the f-V margin analysis, and the most effective operation point of the FACTS installed in the Yang-ju substation, the Mi-gum substation and the East-Seoul substation is determined based on the VQVI index, if it is determined that there is a need to secure the margin of the stability, thereby enhancing the voltage stability.

As apparent from the above description, the present invention provides a cooperative control system for multiple FACTS and a method thereof, which determines a state of a power system in a domestic metropolitan area based on data from a SCADA/EMS according to conditions or determines voltage stability through simulation, and automatically generates a corresponding command, thereby securing the voltage stability according to the power systems or the locations at a normal operation or at contingency.

Although the present invention has been described with reference to the embodiments and the accompanying drawings, it will be apparent to those skilled in the art that the embodiments are given by way of illustration, and that various modifications and equivalent embodiments can be made without departing from the spirit and scope of the present invention, as set forth in the following claims.

What is claimed is:

1. A method of controlling multiple flexible alternating current transmission systems (FACTS), the method comprising:

monitoring voltage stability based on data from a supervisory control and data acquisition (SCADA)/emergency management system (EMS) that receives data from a power system and FACTS data from local FACTS controllers;

determining whether a margin of the voltage stability is within a reference stability and generating a reference voltage Vref and a reactive power output Qout according to the state of the system through calculation of power and flow voltage, as a control command for changing an operation point of the FACTS, each of which is installed in a substation, if the margin of the voltage stability is within the reference stability; and supplying the reference voltage and the reactive power output to the FACTS controller of each local substation, the FACTS controller of each local substation being operated with the operation point of the FACTS changed depending on the control command by using VQVI index, and the FACTS controller of each local substation providing the FACTS data to the SCADA/EMS.

2. The method according to claim 1, wherein the monitoring voltage stability is performed through a flow voltage (FV) module, a reactive power & voltage current (VQVI) module, a power-voltage (PV) module, and a voltage variation (ΔV) module.

3. The method according to claim 1, wherein each local substation uses communication-based information technology (IT) to communicate data.

4. A system of controlling multiple flexible alternating current transmission systems (FACTS), the system comprising:

a supervisory control and data acquisition (SCADA)/emergency management system (EMS) confirgured to receive data from a power system and FACTS data from local FACTS controllers; and a multiple-FACTS controller configured to monitor voltage stability based on data from the SCADA/EMS, to generate a reference voltage Vref and a reactive power output Qout according to the state of the system through calculation of power and flow voltage, as a control command for changing an operation point of the FACTS each installed in a substation, and to supply the reference voltage and the reactive power output to the FACTS controller of each local substation, the FACTS controller of each local substation being operated with the operation point of the FACTS changed depending on the control command by using VQVI index, and the FACTS controller of each local substation providing the FACTS data to the SCADA/EMS.

5. The system according to claim 4, wherein the multiple-FACTS controller comprises a flow voltage (FV) module, a reactive power & voltage current (VQVI) module, a power-voltage (PV) module, and a voltage variation (ΔV) module to monitor the voltage stability.

6. The system according to claim 4, wherein each local substation uses communication-based information technology (IT) to communicate data.

7. The system according to claim 4, further comprising a terminal which receives an output from the multiple-FACTS controller and displays the output to a supervisor.

* * * * *